(12) United States Patent
Doherty et al.

(10) Patent No.: US 6,759,771 B2
(45) Date of Patent: Jul. 6, 2004

(54) HIGH SPEED GENERATOR WITH INTEGRALLY FORMED ROTOR COIL SUPPORT WEDGES

(75) Inventors: Kieran P. J. Doherty, Oro Valley, AZ (US); Edward W. Down, Tucson, AZ (US); William M. Scherzinger, Tucson, AZ (US); David E. Stout, Tucson, AZ (US); Simon L. Waddell, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 6 days.

(21) Appl. No.: 10/242,125

(22) Filed: Sep. 12, 2002

(65) Prior Publication Data

US 2004/0051405 A1 Mar. 18, 2004

(51) Int. Cl.[7] .............................. H02K 9/00; H02K 3/52
(52) U.S. Cl. .............................. 310/58; 310/52; 310/59; 310/214; 310/215; 310/261; 310/262
(58) Field of Search ..................... 310/52–61, 261–262, 310/214–215

(56) References Cited

U.S. PATENT DOCUMENTS

| | | | |
|---|---|---|---|
| 3,127,530 A | 3/1964 | White | 310/57 |
| 3,447,002 A | 5/1969 | Ronnevig | 310/54 |
| 3,480,810 A | 11/1969 | Potter | 310/54 |
| 3,521,094 A | 7/1970 | Renz et al. | 310/58 |
| 3,597,645 A | 8/1971 | Duffert et al. | 310/54 |
| 4,296,544 A | * 10/1981 | Burgmeier et al. | 29/598 |
| 4,692,644 A | 9/1987 | Lenz et al. | 310/61 |
| 4,943,746 A | * 7/1990 | Scherzinger et al. | 310/61 |
| 5,140,204 A | * 8/1992 | Cashmore et al. | 310/61 |
| 5,620,646 A | 4/1997 | Sparer et al. | 310/54 |
| 5,698,924 A | 12/1997 | Nishida | 310/214 |
| 5,864,187 A | 1/1999 | Gonzalez | 310/42 |
| 6,113,024 A | * 9/2000 | Pittard et al. | 310/214 |

* cited by examiner

Primary Examiner—Tran Nguyen
Assistant Examiner—J. Aguirrechea
(74) Attorney, Agent, or Firm—Douglas A. Mullen, Esq.

(57) ABSTRACT

A coil support wedge for a high speed generator is integrally constructed and includes a plurality of flow passageways. Because it is integrally formed, the support wedge is substantially fluid tight. Thus, it is less susceptible to cooling fluid leakage from the flow passageways, which increases the overall reliability of the generator into which the wedge is installed.

26 Claims, 10 Drawing Sheets

HIGH SPEED GENERATOR WITH INTEGRALLY FORMED ROTOR COIL SUPPORT WEDGES

This invention was made with Government support under Agreement No. DTFR53-99-H-0006 awarded by Federal Railroad Administration. The Government may have certain rights in this invention.

FIELD OF THE INVENTION

The present invention relates to high speed generators and, more particularly, to high speed generators that are used with gas turbine engines such as those used in aircraft, tanks, ships, terrestrial vehicles, or other applications.

BACKGROUND OF THE INVENTION

A generator system for a gas turbine engine, such as that found in aircraft, ships, and some terrestrial vehicles, may include three separate brushless generators, namely, a permanent magnet generator (PMG), an exciter, and a main generator. The PMG includes permanent magnets on its rotor. When the PMG rotates, AC currents are induced in stator windings of the PMG. These AC currents are typically fed to a regulator or a generator control device, which in turn outputs a DC current. This DC current next is provided to stator windings of the exciter. As the rotor of the exciter rotates, three phases of AC current are typically induced in the rotor windings. Rectifier circuits that rotate with the rotor of the exciter rectify this three-phase AC current, and the resulting DC currents are provided to the rotor windings of the main generator. Finally, as the rotor of the main generator rotates, three phases of AC current are typically induced in its stator, and this three-phase AC output can then be provided to a load such as, for example, an aircraft, ship, or vehicle electrical system.

Because some aircraft generators are high speed generators with potential rotational speeds up to and in excess of 24,000 rpm, potentially large centrifugal forces may be imposed upon the rotors in generators. Given these potentially stressful operating conditions, the rotors should be carefully designed and manufactured, so that the rotors are reliable and precisely balanced. Improper balancing not only can result in inefficiencies in the operation of a generator, but may also affect the reliability of in the generator.

Among the components of a rotor that provide increased reliability and proper balancing of the rotors are the wire coils wound on the rotor. The centrifugal forces experienced by a rotor may be strong enough to cause bending of the wires of these coils into what is known as the interpole region. Over time, such bending can result in mechanical breakdown of the wires and compromise of the coil insulation system. Additionally, because the coils are assemblies of individual wires that can move to some extent with respect to one another and with respect to the remaining portions of the rotors, the coils are a potential source of imbalance within the rotor and can potentially compromise the insulation system. Even asymmetrical movements of these coils on the order of only a few thousandths of an inch can, in some instances, be significant.

In order to improve the strength and reliability of the wire coils and the coil insulation system, and to minimize the amount of imbalance in the rotors that may occur due to the wire coils, the rotors may include a coil retention system. With a coil retention system, substantially rigid wedges are inserted in between neighboring poles of the rotors to reduce the likelihood of coil wire bending or movement. In some embodiments, the wedges may also exert some force onto the coils to help maintain the physical arrangement of the coils.

In addition to the rotor, various other mechanical components within the generator rotate at high speeds and thus may be supplied with lubricant. Moreover, some of the electrical components within the generator may generate heat due to electrical losses, and may thus be supplied with a cooling medium. The lubricating and cooling media may be supplied from different systems, or from a single system that supplies a fluid, such as oil, that acts as both a lubricating and a cooling medium. The lubricating and cooling medium supplied to the generator may flow into and through the shaft on which the main generator rotor is mounted, and be supplied to the various mechanical and electrical components via flow orifices formed in the shaft.

Among the electrical components that may generate heat during generator operation are the rotor coils. In some generator designs, the wedges of the coil retention system are configured to allow a portion of the lubricating and cooling medium to flow through them. As the medium flows through the wedges it removes heat generated in the coils. In some generators, these wedges consist of multiple structural components that are joined together. As was noted above, these components may experience large centrifugal forces during rotor rotation, which may cause leaks where the structural components are joined. Because the wedges should be leak-tight, any leakage or failure of a wedge requires disassembly of the generator, and replacement of the wedge. This can be a time-consuming and expensive operation.

Although the wedges employed in conventional coil retention systems operate safely, the design of these conventional wedges also limits their effectiveness. Hence there is a need for a coil support wedge that can provide sufficient support for the rotor coils during generator operation and that can provide relatively leak-tight cooling for the coils and/or is less susceptible to leaks and/or reduces the likelihood of wedge replacement. The present invention addresses one or more of these needs.

SUMMARY OF THE INVENTION

The present invention provides a coil support wedge that is integrally formed and includes internal flow passageways that are substantially fluid tight, thereby increasing the overall reliability of the generator by making it less likely to undergo support wedge replacement or servicing.

In embodiment, and by way of example only, a high speed generator includes a stator and a rotor. The rotor is rotationally mounted within the stator and includes a shaft, at least first and second poles, and a coil support wedge. Each pole extends radially outwardly from the shaft and the poles are spaced apart from one another to form an interpole region therebetween. The coil support wedge is positioned in the interpole region and includes an integrally formed, longitudinally extending main body, and first, second, third, and fourth fluid passageways. The main body has at least a first end, a second end, and an outer surface. The first fluid passageway has an inlet port formed in the support wedge first end and an outlet port formed in the support wedge second end. The second fluid passageway has an inlet port formed in the support wedge second end and an outlet port formed in the support wedge first end, and its inlet port is in fluid communication with the first fluid passageway outlet port. The third fluid passageway has an inlet port formed in the support wedge first end and extends at least partially into the support wedge to an end. The fourth fluid passageway has an outlet port formed in the support wedge first end and extends at least partially into the support wedge to an end, the end of the fourth fluid passageway is in fluid communication with the end of the third fluid passageway.

In another exemplary embodiment, a rotor for use in a high speed generator includes a shaft, at least first and second poles, and a coil support wedge. Each pole extends radially outwardly from the shaft and the poles are spaced apart from one another to form an interpole region therebetween. The coil support wedge is positioned in the interpole region and includes an integrally formed, longitudinally extending main body, and first, second, third, and fourth fluid passageways. The main body has at least a first end, a second end, and an outer surface. The first fluid passageway has an inlet port formed in the support wedge first end and an outlet port formed in the support wedge second end. The second fluid passageway has an inlet port formed in the support wedge second end and an outlet port formed in the support wedge first end, and its inlet port is in fluid communication with the first fluid passageway outlet port. The third fluid passageway has an inlet port formed in the support wedge first end and extends at least partially into the support wedge to an end. The fourth fluid passageway has an outlet port formed in the support wedge first end and extends at least partially into the support wedge to an end, the end of the fourth fluid passageway is in fluid communication with the end of the third fluid passageway.

In yet a further embodiment, an interpole coil support wedge for placement in an interpole region that is formed between adjacent poles of a rotor assembly includes an integrally formed, longitudinally extending main body, and first, second, third, and fourth fluid passageways. The main body has at least a first end, a second end, and an outer surface. The first fluid passageway has an inlet port formed in the support wedge first end and an outlet port formed in the support wedge second end. The second fluid passageway has an inlet port formed in the support wedge second end and an outlet port formed in the support wedge first end, and its inlet port is in fluid communication with the first fluid passageway outlet port. The third fluid passageway has an inlet port formed in the support wedge first end and extends at least partially into the support wedge to an end. The fourth fluid passageway has an outlet port formed in the support wedge first end and extends at least partially into the support wedge to an end, the end of the fourth fluid passageway is in fluid communication with the end of the third fluid passageway.

Other independent features and advantages of the preferred coil support wedge will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the present invention is not limited to use in conjunction with a specific type of electrical machine. Thus, although the present embodiment is, for convenience of explanation, depicted and described as being implemented in a brushless AC (alternating current) generator, it will be appreciated that it can be implemented in other AC generator designs needed in specific applications.

Figure 1:
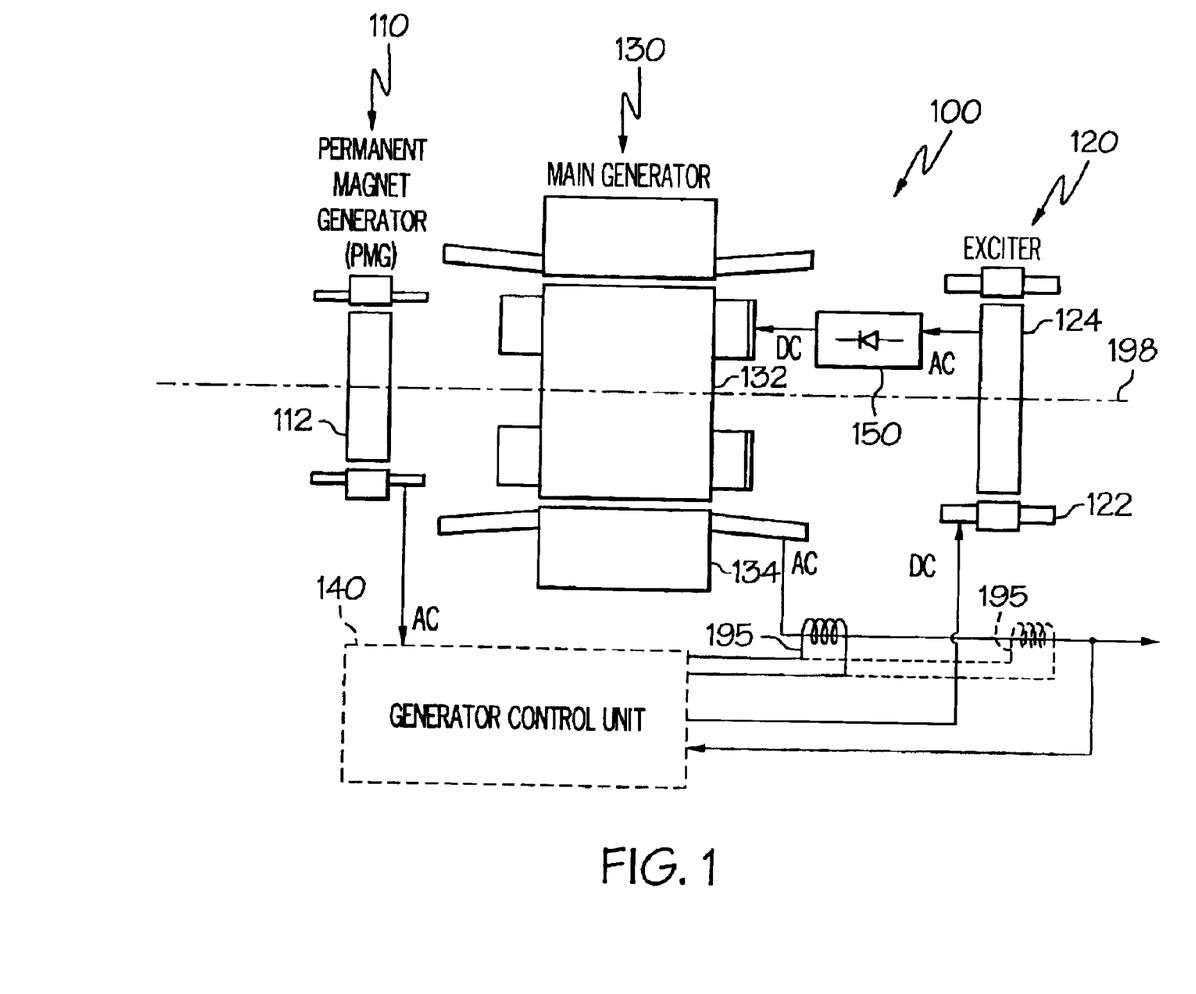
FIG. 1 is a functional schematic block diagram of an exemplary high speed generator system.

Turning now to the description, and with reference first to FIG. 1, a functional schematic block diagram of an exemplary high speed generator system 100 for use with a gas turbine engine such as that in an aircraft is depicted. This exemplary generator system 100, which is commonly known as a brushless AC generator, includes a permanent magnet generator (PMG) 110, an exciter 120, a main generator 130, a generator control unit 140, and one or more rectifier assemblies 150. During operation, a rotor 112 of the PMG 110, a rotor 124 of the exciter 120, and a rotor 132 of the main generator 130 all rotate. The rotational speed of these components may vary. In one embodiment, the rotational speed may be, for example, in the range of about 12,000 to about 24,000 r.p.m., or greater. As the PMG rotor 112 rotates, the PMG 110 generates and supplies AC power to the generator control unit 140, which in turn supplies direct current (DC) power to a stator 122 of the exciter 120. The exciter rotor 124 in turn supplies AC power to the rectifier assemblies 150. The output from the rectifier assemblies 150 is DC power and is supplied to the main generator rotor 132, which in turn outputs AC power from a main generator stator 134.

The generator system 100 is capable of providing output power at a variety of frequencies and over a variety of frequency ranges. Further, typically the output power from the main generator stator 134 is three-phase AC power. The generator control unit 140 can regulate the power output based upon monitoring signals provided to it from monitoring devices 195. In the depicted embodiment, the PMG rotor 112, the exciter rotor 124, and the main generator rotor 132 all rotate along a single axis 198 at the same rotational speed. It will be appreciated, however, that in other embodiments the PMG rotor 112 may rotate along a different axis. Moreover, the relative positioning of the PMG 110, the exciter 120, and the main generator 130 can be modified in different embodiments such that the exciter 120 is physically between the PMG 110 and the main generator 130. A perspective view of a physical embodiment of at least those portions of the generator system 100 that are mounted within a generator housing 200 is provided in FIG. 2.

Figure 2:
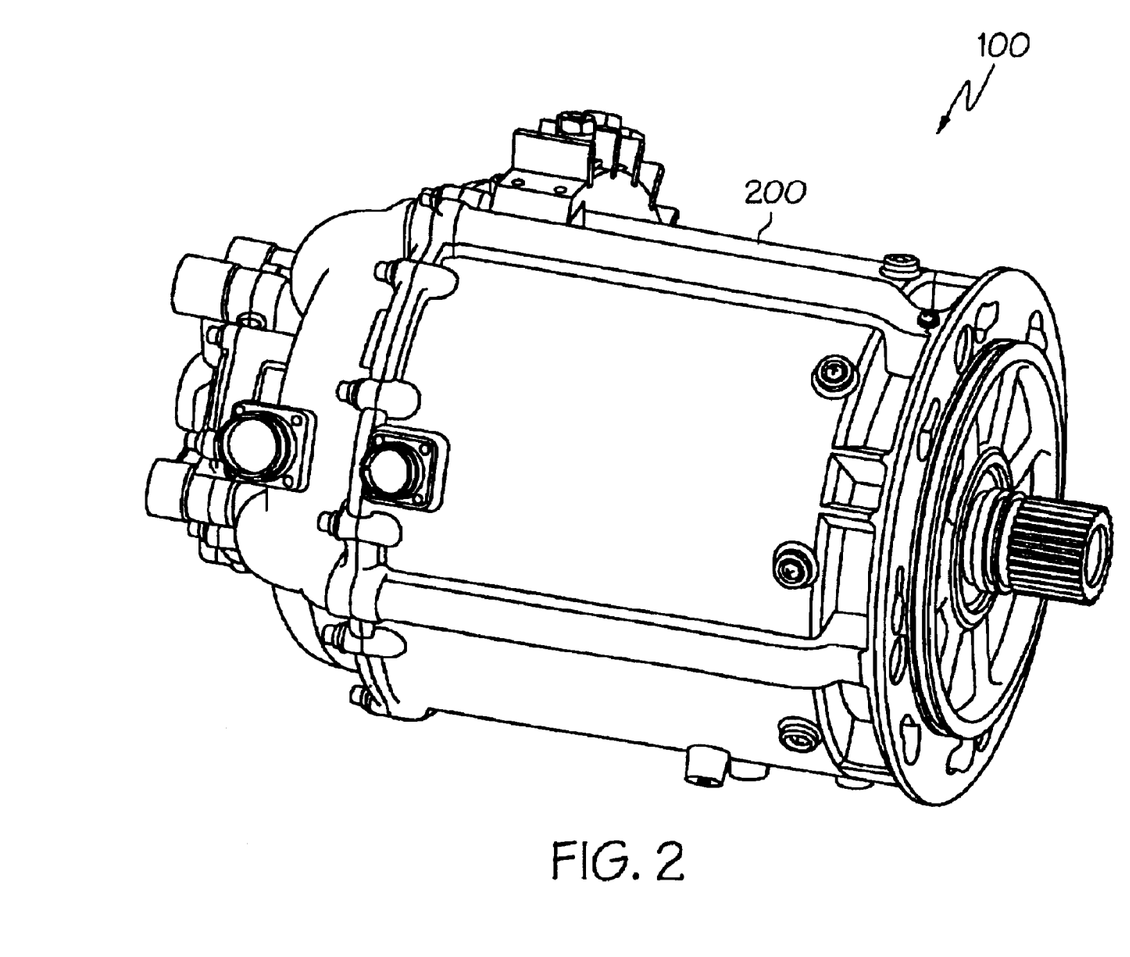
FIG. 2 is a perspective view of a physical embodiment of the generator system depicted in FIG. 1.
Figure 3:
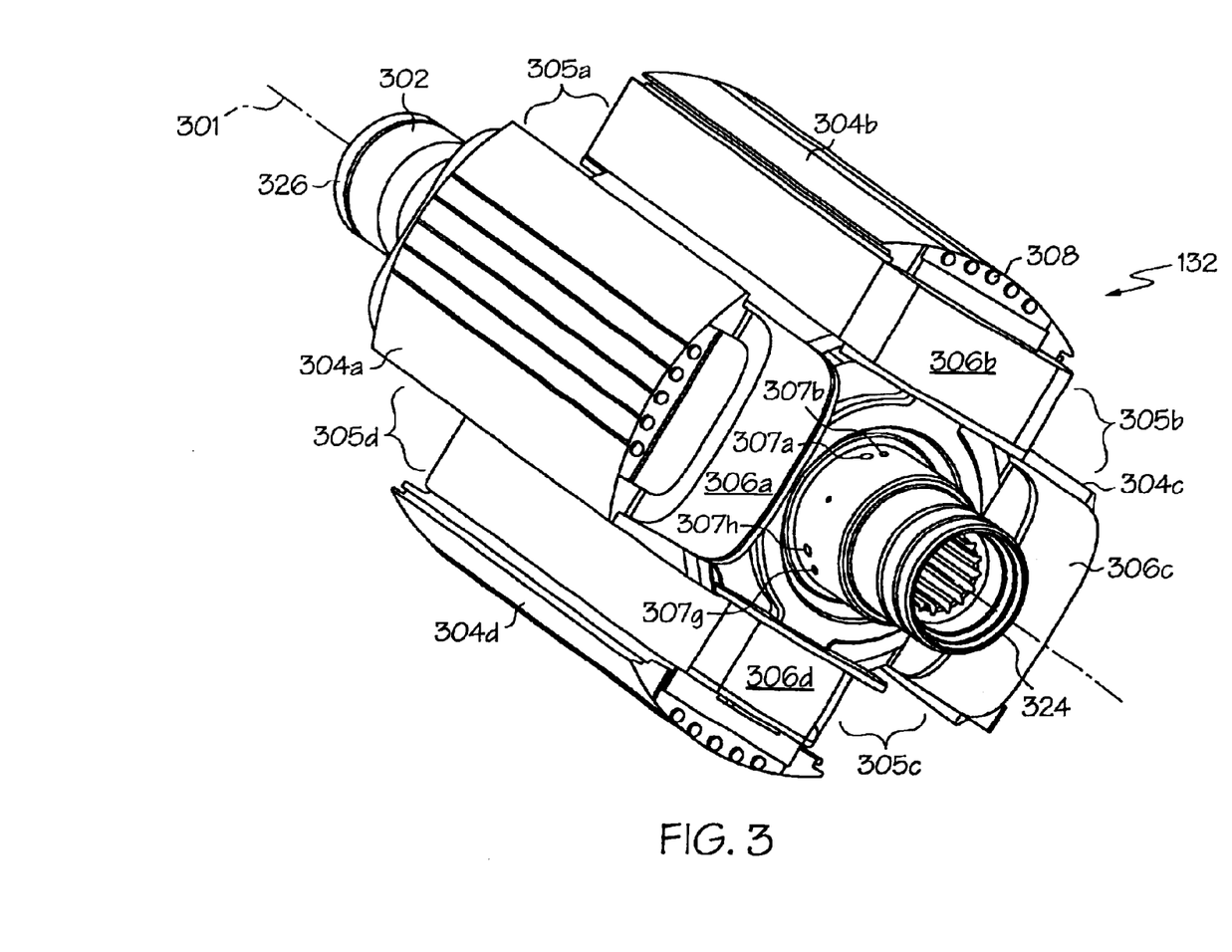
FIG. 3 is a perspective view of an exemplary embodiment of a partially assembled rotor that may be used in the generator depicted in FIG. 2.

Turning now to FIG. 3, a perspective view of an exemplary embodiment of the main generator rotor 132 that may be used in the generator system illustrated in FIGS. 1 and 2 is illustrated in a partially assembled configuration. As shown, the main generator rotor 132 includes a shaft assembly 302, a plurality of poles 304a–d, and a plurality of coils 306a–d. The shaft assembly 302 extends axially through the main generator rotor 132 along an axis 301, and includes a first end 324 and a second end 326. The first end 324 is adapted to be coupled to a non-illustrated prime mover, which could be the aforementioned gas turbine engine, and thus may be referred to as the "drive end," while the second end 326 may be referred to as the "anti-drive end." The shaft assembly 302 is substantially hollow along most of its length, and includes an opening (not illustrated) in one end and is preferably closed at the other end. In the depicted embodiment, the anti-drive end 326 is open and the drive end 324 is closed. A cooling fluid, such as oil, is supplied to the generator and is directed into the opening in the anti-drive end 326 of the shaft assembly 302. The shaft assembly 302 includes a plurality of orifices 307a–h (only four are shown in FIG. 3) that port the oil supplied to the shaft assembly 302 to coil support wedges, which are described further below, and port oil back to the shaft assembly 302 after circulating through the wedges. A detailed description of the structure that provides oil flow to and from the shaft assembly 302 and through the orifices 307a–h is provided further below.

Each of the poles 304a–d extends radially away from the shaft assembly 302 and are generally spaced evenly apart from one another, forming an interpole region 305a–d between adjacent poles 304a–d. In addition, a plurality of weights 308 may be embedded within each of the poles 304a–d to provide proper balancing of the main generator rotor 132. The components of the main generator rotor 132 are typically manufactured from high-strength materials. For example, the poles 304a–d may be formed from steel, while the shaft assembly 302 may be formed from steel, titanium or high-strength aluminum. It will be appreciated, however, that these materials are only exemplary of a preferred embodiment and that other suitable materials can be employed. Moreover, although the main generator rotor 132 depicted in FIG. 3 is a four-pole rotor, it will be appreciated that the present invention may be used with rotors having other numbers of poles.

The coils 306a–d are wrapped, one each, around a respective pole 304a–d, and are preferably formed by wrapping numerous individual wire windings around the respective poles 304a–d. It is noted that the coils 306a–d may be formed of any one of numerous conductors, but in a preferred embodiment are formed from copper.

Figure 4:
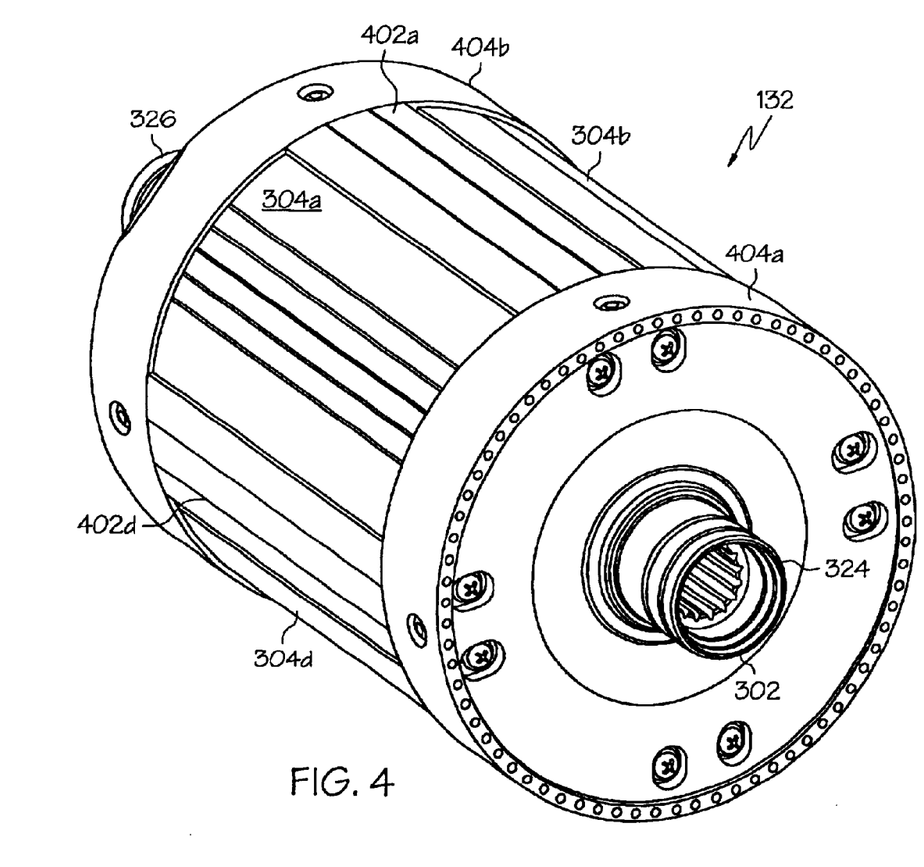
FIG. 4 is a perspective view of the rotor depicted in FIG. 3 in its fully assembled state.

As was noted above, many high speed generators include coil support wedges to improve the strength and reliability of the coils 306a–d, to increase the life of the coil insulation system, and to minimize any rotor imbalance that may occur from movement of the coils 306a–d. Thus, as illustrated in FIG. 4, which is a perspective view of the fully assembled main generator rotor 132, it can be seen that coil support wedges 402a–d (support wedges 402b, c not shown in FIG. 4) are positioned within each of the interpole regions 305a–d. In the depicted embodiment, two rotor end caps 404a and 404b, one on each end of the shaft assembly 302, hold the coil support wedges 402a–d in place in their respective interpole regions 305a–d. It will be appreciated that the use of end caps 404a, b is merely exemplary of a particular embodiment and that other devices such as, for example, bands or various types of fasteners, may be used to hold the coil support wedges 402a–d in place.

Figures 5, 6, 7:
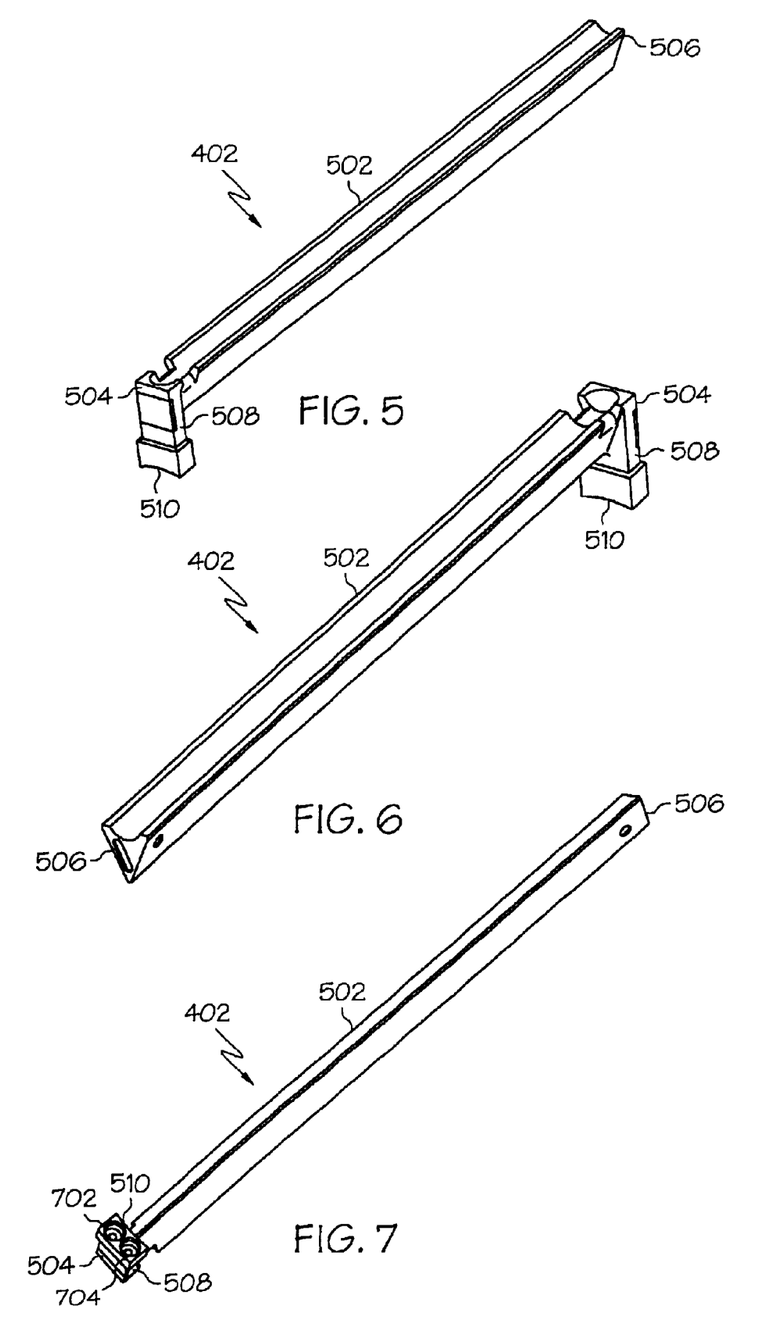
FIGS. 5–7 are various perspective views of an exemplary embodiment of a coil support wedge that may be used with the rotor depicted in FIGS. 3 and 4.

Each coil support wedge 402, an exemplary one of which is illustrated in perspective in FIGS. 5, 6, and 7, includes an integrally formed, longitudinally extending main body 502, having a first end 504, which corresponds with the shaft drive end 324, and a second end 506, which corresponds with the shaft anti-drive end 326. A flow manifold 508 is integrally formed on the wedge first end 504. The manifold 508 includes a bottom surface 510 that is substantially curved in shape. In particular, the bottom surface 510 is preferably machined to provide a curvature radius that substantially matches the outer contour of the shaft assembly 302. As illustrated most clearly in FIG. 7, the manifold 508 additionally includes at least two fluid passages, a fluid inlet passage 702 and a fluid outlet passage 704, that extend from the bottom surface 510 into the manifold 508. These fluid passages 702, 704 are collocated with the respective ones of the orifices 307a–h formed in the shaft assembly 302. As FIG. 7 also shows, the fluid passages 702, 704 in the depicted embodiment are counter-bored. The reason for this will be described more fully below.

Figure 8:
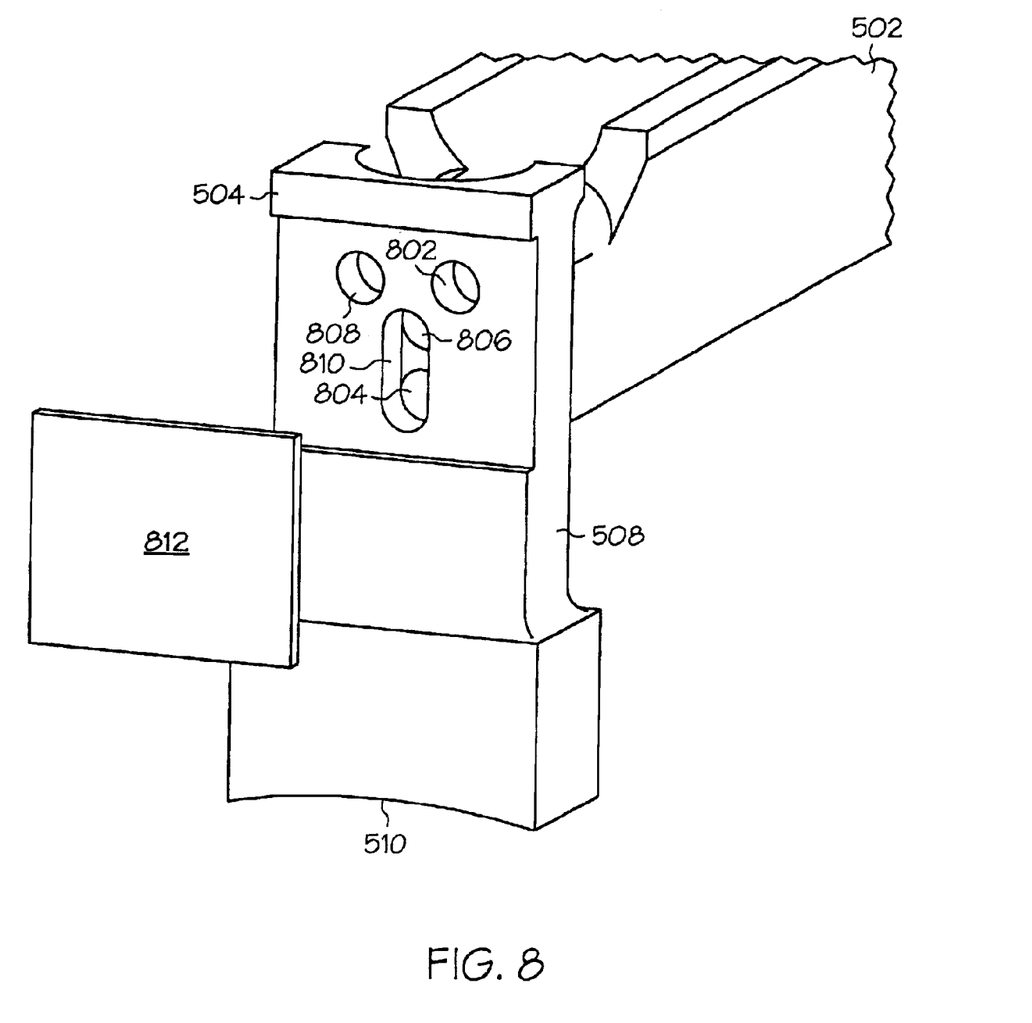
FIG. 8 is an exploded close up perspective view of one end of the coil support wedge depicted in FIGS. 5–7.
Figure 9:
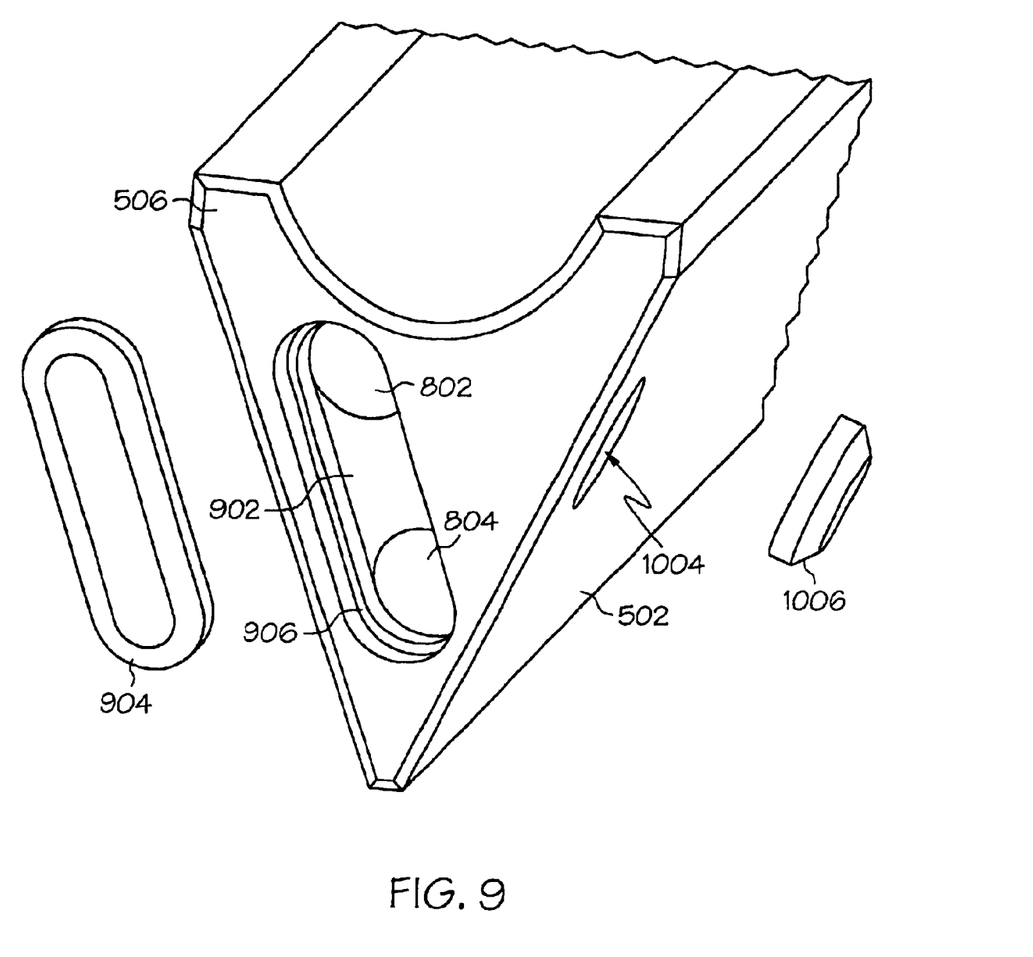
FIG. 9 is an exploded close up perspective view of another end of the coil support wedge depicted in FIGS. 5–7.

Turning now to FIGS. 8 and 9, it can be seen that a plurality of fluid passageways are formed into each integral coil support wedge 402. In the depicted embodiment, four fluid passageways, including a first fluid passageway 802, a second fluid passageway 804, a third fluid passageway 806, and a fourth fluid passageway 808, are formed into each integral coil support wedge 402. The fluid passageways have a generally circular cross section, though it will be appreciated that numerous other cross sectional shapes may be used. The first fluid passageway 802 is in fluid communication with the fluid inlet passage 702 and extends completely through the wedge main body 502 (see FIG. 9). The second fluid passageway 804 also extends completely through the wedge main body 502. However, the third 806 and fourth 808 fluid passageways extend only part way through the wedge main body 502. It will be appreciated that the length of the third 806 and fourth 808 fluid passageways may vary, but preferably extend along a substantial portion of the entire wedge main body 502. The fourth fluid passageway 808 is in fluid communication with the fluid outlet passage 704. It will be appreciated that four fluid passages is merely exemplary of a particular preferred embodiment and that other numbers of fluid passageways may also be formed in the integral support wedges 402.

The support wedge 402 is integrally formed using any one of numerous processes including, but not limited to, die casting, and extrusion processes. However, in a preferred embodiment, the support wedge 402 is formed by machining it from a solid bar or billet of material, such as, for example, aluminum. The fluid passageways are formed in the main body 502 by, for example, a precision drilling process.

Figure 11:
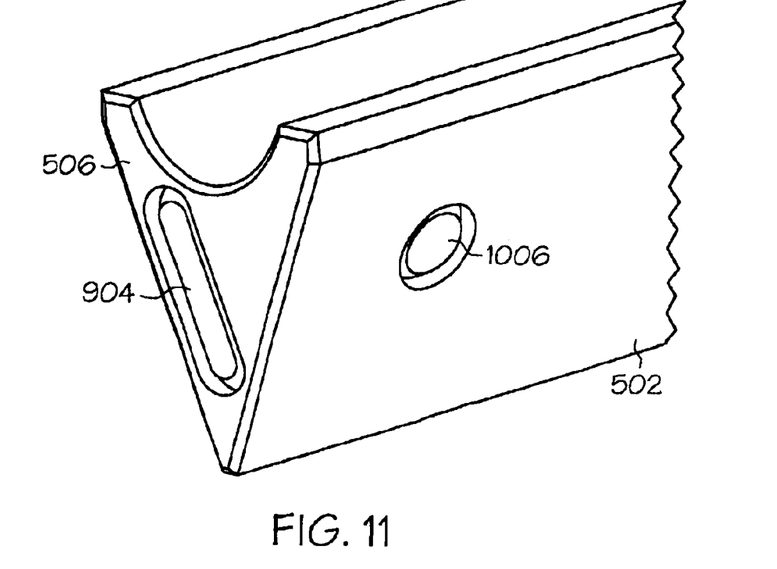
FIG. 11 is of a perspective view of the coil support wedge end depicted in FIG. 9.

As illustrated in FIG. 9, a first recess 902 is formed in the wedge second end 506 by, for example, a milling process. A first plug 904 having an outer perimeter that conforms to the inner perimeter of the first recess 902 is then inserted into the recess 902. The first recess 902 preferably includes a ledge 906 against which the first plug 904 rests when inserted therein. As a result, when the first plug 904 is inserted by, for example, a shrink fitting and seal welding process (see FIG. 11), the first 802 and second 804 fluid passageways are sealed from the external environment, while simultaneously being placed in fluid communication with one another at the second end 506 of the integral coil support wedge 402.

Figure 10:
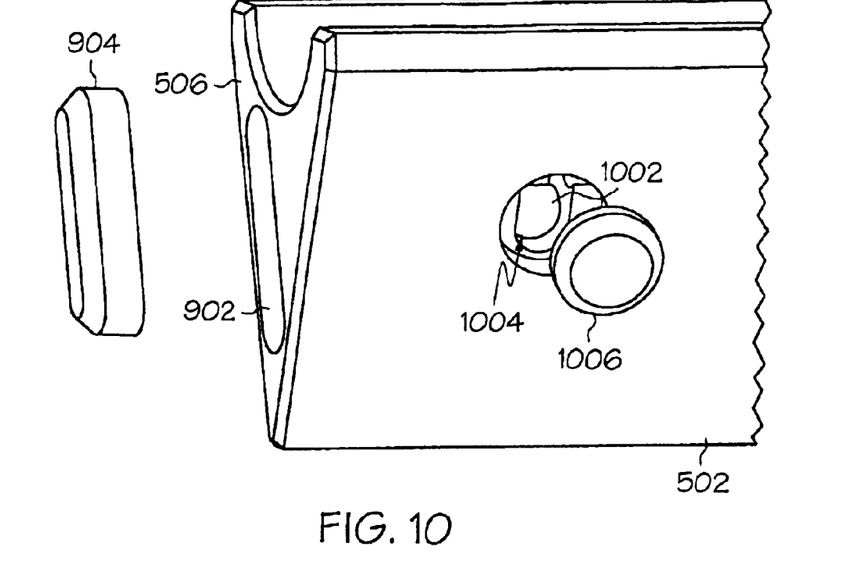
FIG. 10 is another exploded perspective view of the coil support wedge end depicted in FIG. 9.

With reference now to FIG. 10, an internal flow channel 1002 is formed by, for example, milling an opening 1004 through the integral coil support wedge main body 502. The flow channel 1002 is formed near the location where each of the third 806 and fourth 808 fluid passageways end, and places these fluid passageways in fluid communication with one another. Similar to what was done for the recess 904 formed in the second end 506, a second plug 1006 is inserted into the opening 1004 in the main body 502 by, for example, a shrink fitting and seal welding process (see FIG. 11). The second plug 1006 seals the third 806 and fourth 808 flow channels from the external environment.

Returning now to FIG. 8, it can be seen that a second recess 810 is formed in the wedge first end 504. Unlike the first recess 902, a seal plug is not inserted into the second recess 810. Instead, a seal plate 812 is coupled to the wedge first end 504 by, for example, a seal welding process (see FIG. 5). The seal plate 812 seals the fluid passageways 802–808 at the first end 504 from the external environment. However, due to the second recess 810, the second 804 and third 806 fluid passageways remain in fluid communication with one another.

Figure 12:
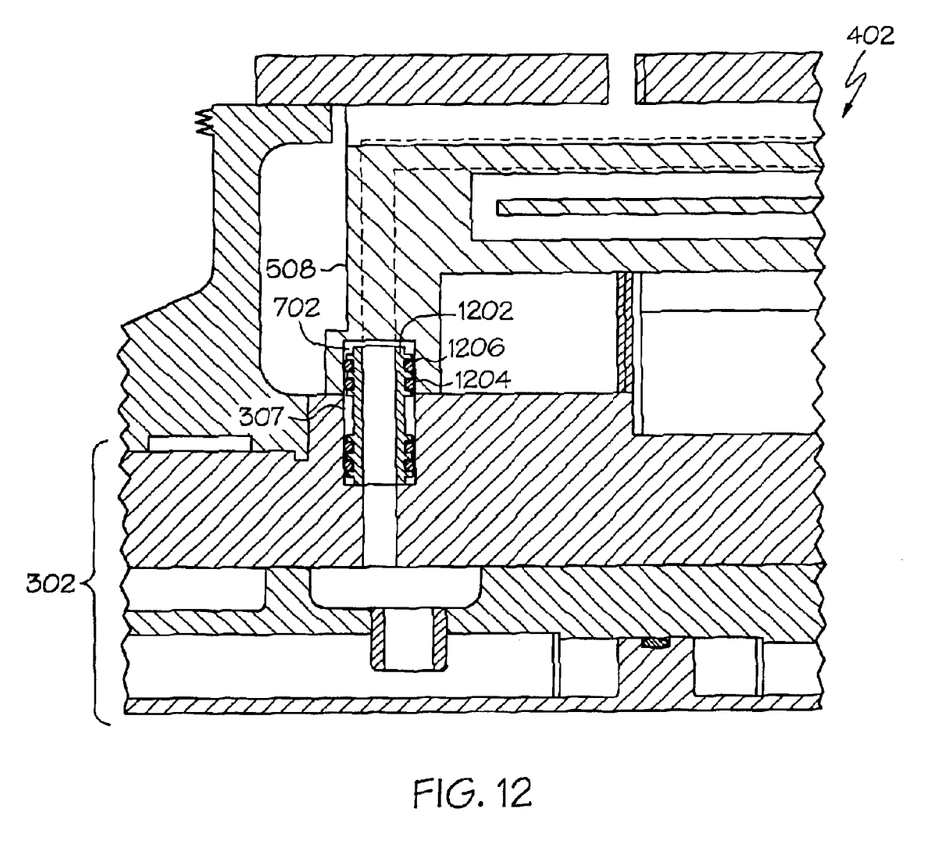
FIG. 12 is a cross section view of a portion of the rotor and one of the coil support wedges.

Turning now to FIG. 12, in the depicted embodiment the cooling oil is transferred between the shaft assembly 302 and the wedges 402 via transfer tubes 1202. There are two transfer tubes 1202 per wedge 402, one for each wedge fluid inlet passage 702 and one for each wedge fluid outlet passage 704. Only one of the transfer tubes 1202, the one for the wedge fluid inlet passage 702, is shown in FIG. 12. As was noted above, each fluid passage 702, 704 is counter-bored to accept one end of the transfer tube 1202. The other end of the transfer tube 1202 fits within the respective collocated shaft assembly orifice 307. Two seals 1204, 1206 may be included on each end of the transfer tube 1202 to provide a fluid-tight seal between the shaft assembly 302 and the wedges 402.

As was described above, cooling oil is directed into the opening in the shaft assembly anti-drive end 326. The cooling oil is then directed out some of the orifices 307a–h, through the wedges 402a–d, back through other ones of the orifices 307a–h, and back into the shaft assembly 302. Cooling oil flow to and from the shaft assembly 302 is, in the depicted embodiment, accomplished by using a the shaft assembly 302 is that constructed to include at least two internal flow paths. With reference now to the embodiment depicted in FIG. 13, this is implemented by constructing shaft assembly 302 of at least three sections, an inner section 1302, an intermediate section 1304, and an outer section 1306. A return flow passage 1308 is formed between the inner section 1302 and the intermediate section 1304. A plurality of return flow ports 1310, one for each support wedge 402a–d, are each in fluid communication with a support wedge outlet passage 704, via an orifice 307. Thus, oil returned from the support wedges 402a–d flows and into and through the return flow ports 1310 and into the return flow passage 1308. The intermediate section 1304 is positioned between the inner 1302 and outer 1306 sections, and forms a plurality of supply flow ports 1312, one for each support wedge 402a–d, between the intermediate section 1304 and the outer section 1306. Each supply flow port 1312 is in fluid communication with a support wedge inlet passage 702, via an orifice 307.

Having described the integral coil support wedge 402 from a structural standpoint, a description of how the cooling medium flows to, through, and from each integral coil support wedge 402 will now be provided. In doing so, the flow through a single integral coil support wedge 402 will be provided. It will be appreciated that flow through the remaining other wedges installed in the generator would be substantially similar.

Figure 13:
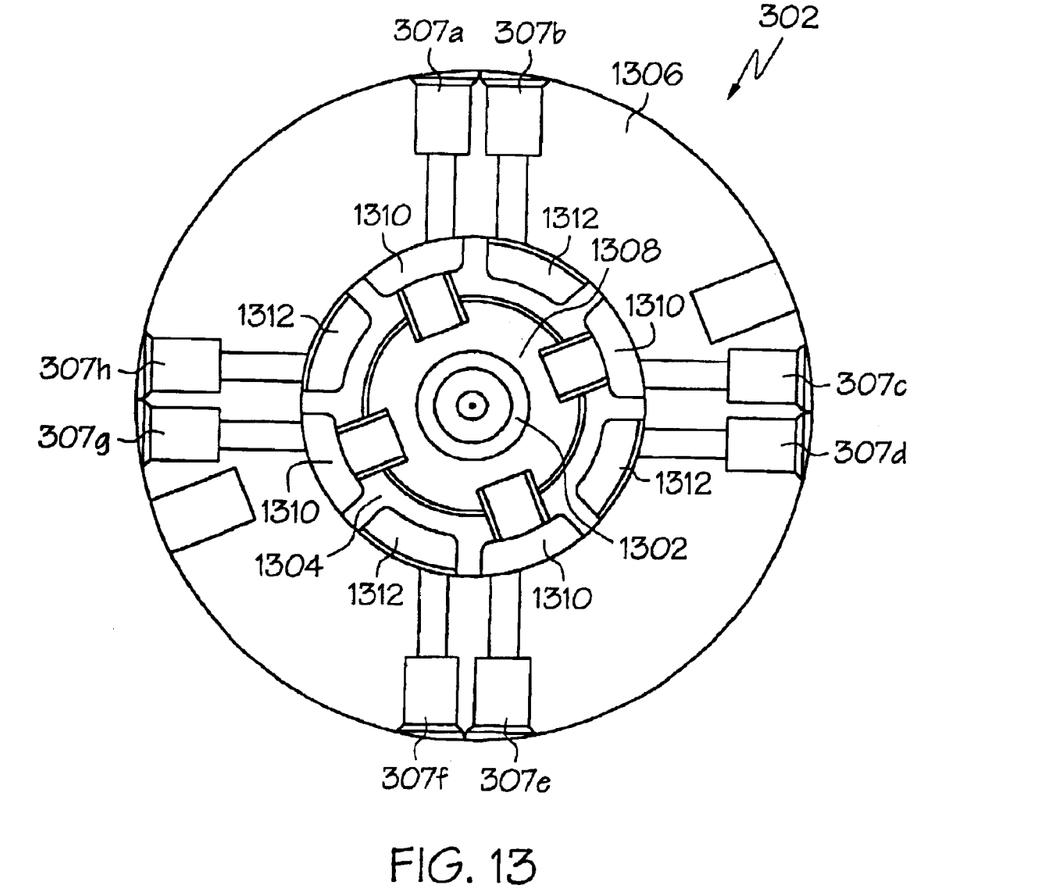
FIG. 13 is a cross sectional end view of an exemplary shaft assembly that may be used in the rotor depicted in FIG. 2.

As was previously noted above, the cooling medium, such as oil, is supplied into the shaft assembly 302. The cooling medium is directed between the intermediate 1304 and outer 1306 shaft assembly sections and into a supply flow port 1312. The cooling medium is then directed through one of the orifices 307 formed in the shaft assembly outer section 1306, and in particular through the orifice 307 that is collocated with the fluid inlet passage 702 formed in the wedge manifold 508. The cooling medium enters the fluid inlet passage 702 and flows into the first fluid passageway 802. Because the seal plate 812 seals the first fluid passageway 802 at the first end 504, the cooling medium is forced to flow through the first fluid passageway 802 toward the wedge second end 506. At the wedge second end 506, the fluid exits the first fluid passageway 802, enters the first recess 902 and, due to the presence of the first plug 904, is directed into the second fluid passageway 804. The cooling medium then flows in the second passageway 804 toward the wedge first end 504.

When the cooling medium in the second passageway 804 reaches the wedge first end 504, it enters the second recess 810 and, once again because of the seal plate 812, it is forced into the third fluid passageway 806. The cooling medium then flows in the third fluid passageway 806 toward the wedge second end 506. As was previously noted, the third 806 and fourth 808 fluid passageways do not extend through to the wedge second end 506, but instead stop short. However, when the cooling medium reaches the end of the third fluid passageway 806, it is directed into the fourth fluid passageway 808 via the flow channel 1002. From there, the cooling medium flows through the fourth fluid passageway 808 toward the wedge first end 504. When it reaches the wedge first end 504, the seal plate 812 directs the cooling medium flow into the fluid outlet passage 704 formed in the manifold 510. The cooling then flows out the fluid outlet passage 704, into the shaft assembly 302 via the collocated orifice 307, and then into the return flow passage 1308, via a return flow port 1310.

The coil support wedge depicted and described herein is integrally formed and substantially fluid tight. Thus, it is less susceptible to cooling fluid leakage from the fluid passageways formed in the wedge, which increases the overall reliability of the generator into which the wedges are installed.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A high speed generator, comprising:
   a stator; and
   a rotor rotationally mounted within the stator, the rotor including:
      a shaft,
      at least a first and second pole, each pole extending radially outwardily from the shaft and spaced apart from one another to form an interpole region therebetween, and
      a coil support wedge positioned in the interpole region, the support wedge including:

an integrally formed, longitudinally extending main body having at least a first end, a second end, and an outer surface, a first fluid passageway having an inlet port formed in the support wedge first end and an outlet port formed in the support wedge second end, a second fluid passageway having an inlet port formed in the support wedge second end and an outlet port formed in the support wedge first end, the second fluid passageway inlet port in fluid communication with the first fluid passageway outlet port, a third fluid passageway having an inlet port formed in the support wedge first end and extending at least partially into the support wedge to an end, a fourth fluid passageway having an outlet port formed in the support wedge first end and extending at least partially into the support wedge to an end, the end of the fourth fluid passageway in fluid communication with the end of the third fluid passageway; and a flow channel coupling the ends of the third and fourth fluid passageways in fluid communication with one another.

2. The generator of claim 1, further comprising:

an end plug scalingly coupled to the support wedge second end, whereby the first fluid passageway outlet port and the second fluid passageway inlet port are sealed from an environment external to the support wedge.

3. The generator of claim 1, wherein the flow channel comprises an orifice formed through the wedge outer surface.

4. The generator of claim 3, further comprising:
an orifice plug scalingly coupled in the orifice.

5. The generator of claim 1, further comprising:
a manifold integrally fanned on the support wedge first end, the manifold including:

a fifth fluid passageway having an inlet formed in a first surface of the manifold and an outlet port in fluid communication with the first fluid passageway, and a sixth fluid passageway having an inlet formed in the first surface of the manifold and an outlet in fluid communication with the fourth fluid passageway.

6. The generator of claim 5, wherein the filth and sixth fluid passageways are configured substantially perpendicular to the first and fourth fluid passageways, respectively.

7. The generator of claim 5, further comprising:
an end plate coupled to a second surface of the manifold and scalingly covering at least the first and third fluid passageway inlet ports and the second and fourth fluid passageway outlet ports.

8. The generator of claim 7, further comprising:
a slot formed in the second surface of the manifold, wherein the slot is configured to couple the second fluid passageway outlet port in fluid communication with the third fluid passageway inlet port when the end plate is coupled to the second surface.

9. The generator of claim 1, further comprising:
at least two flow orifices formed in the shaft;

a first tube having a first end inserted in the first fluid passageway inlet port and a second end inserted in one of the flow orifices; and a second tube having a first end inserted in the fourth fluid passageway outlet port and a second end inserted in another one of the flow orifices.

10. A rotor for use in a high speed generator, comprising:
a shaft;

at least a first and a second pole, each pole extending radially outwardly from the shaft and spaced apart from one another to form an interpole region therebetween; and a coil support wedge positioned in the inter-pole region, the support wedge including:

an integrally formed, longitudinally extending main body having at least a first end, a second end, and an outer surface, a first fluid passageway having an inlet port formed in the support wedge first end and an outlet port fanned in the support wedge second end, a second fluid passageway having an inlet port formed in the support wedge second end and an outlet port fanned in the support wedge first end, the second fluid passageway inlet port in fluid communication with the first fluid passageway outlet port, a third fluid passageway having an inlet port formed in the support wedge first end and extending at least partially into the support wedge to an end, a fourth fluid passageway having an outlet port formed in the support wedge first end and extending at least partially into the support wedge to an end, the end of the fourth fluid passageway in fluid communication with the end of the third fluid passageway; and a flow channel coupling the ends of the third and fourth fluid passageways in fluid communication with one another.

11. The rotor of claim 10, further comprising:

an end plug sealingly coupled to the support wedge and end, whereby the first fluid passageway outlet port and the second fluid passageway inlet port are sealed from an environment external to the support wedge.

12. The rotor of claim 10, wherein the flow channel comprises an orifice formed through the wedge outer surface.

13. The rotor of claim 12, further comprising:
an orifice plug sealingly coupled in the orifice.

14. The rotor of claim 10, further comprising:
a manifold integrally formed on the support wedge first end, the manifold including:

a fifth fluid passageway having an inlet formed in a first surface of the manifold and an outlet port in fluid communication with the first fluid passageway; and a sixth fluid passageway having an inlet formed in the first surface of the manifold and an outlet in fluid communication with the fourth fluid passageway.

15. The rotor of claim 14, wherein the fifth and sixth fluid passageways are configured substantially perpendicular to the first and fourth fluid passageways, respectively.

16. The rotor of claim 15, farther comprising:
an end plate coupled to a second surface of the manifold and sealingly covering at least the first and third fluid passageway inlet ports and the second and fourth fluid passageway outlet ports.

17. The rotor of claim 16, further comprising:
a slot formed in the second surface of the manifold, wherein the slot is configured to couple the second fluid passageway outlet port in fluid communication with the third fluid passageway inlet port when the end plate is coupled to the second surface.

18. The rotor of claim 10, further comprising:
at least two flow orifices formed in the shaft;

a first tube having a first end inserted in the first fluid passageway inlet port and a second end inserted in one of the flow orifices; and a second tube having a first end inserted in the fourth fluid passageway outlet port and a second end inserted in another one of the flow orifices.

19. An interpole coil support wedge for placement in an interpole region that is formed between adjacent poles of a rotor assembly, comprising:
- an integrally formed, longitudinally extending main body having at least a first end, a second end, and an outer surface;
- a first fluid passageway having an inlet port formed in the support wedge first end and an outlet port formed in the support wedge second end;
- a second fluid passageway having an inlet port formed in the support wedge second end and an outlet port formed in the support wedge first end, the second fluid passageway inlet port in fluid communication with the first fluid passageway outlet port;
- a third fluid passageway having an inlet port formed in the support wedge first end and extending at least partially into the support wedge to an end;
- a fourth fluid passageway having an outlet port formed in the support wedge first end and extending at least partially into the support wedge to an end, the end of the fourth fluid passageway in fluid communication with the end of the third fluid passageway; and
- a flow channel coupling the ends of the third and fourth fluid passageways in fluid communication with one another.

20. The support wedge of claim 19, further comprising:
an end plug sealingly coupled to the support wedge second cod, whereby the first fluid passageway outlet port and the second fluid passageway inlet port are sealed from an environment external to the support wedge.

21. The support wedge of claim 19, wherein the flow channel comprises an orifice formed through the wedge outer surface.

22. The support wedge of claim 21, further comprising:
an orifice plug sealingly coupled in the orifice.

23. The support wedge of claim 19, further comprising:
a manifold integrally formed on the support wedge first end, the manifold including:
- a fifth fluid passageway having an inlet formed in a first surface of the manifold and an outlet port in fluid communication with the first fluid passageway; and
- a sixth fluid passageway having an inlet formed in the first surface of the manifold and an outlet in fluid communication with the fourth fluid passageway.

24. The support wedge of claim 23, wherein the fifth and sixth fluid passageways are configured substantially perpendicular to the first and fourth fluid passageways, respectively.

25. The support wedge of claim 23, further comprising:
an end plate coupled to a second surface of the manifold and scalingly covering at least the first and third fluid passageway inlet ports and the second and fourth fluid passageway outlet ports.

26. The support wedge of claim 25, further comprising:
a slot formed in the second surface of the manifold,
wherein the slot is configured to couple the second fluid passageway outlet port in fluid communication with the third fluid passageway inlet port wherein the end plate is coupled to the second surface.

* * * * *